July 7, 1970 W. M. HUBBARD 3,519,937

QUATERNARY DIFFERENTIAL-PHASE-MODULATED PCM REPEATER

Filed Aug. 8, 1967 4 Sheets-Sheet 1

INVENTOR
W. M. HUBBARD
BY
Sylvan Sherman
ATTORNEY

July 7, 1970 W. M. HUBBARD 3,519,937

QUATERNARY DIFFERENTIAL-PHASE-MODULATED PCM REPEATER

Filed Aug. 8, 1967 4 Sheets-Sheet 4

1

3,519,937

QUATERNARY DIFFERENTIAL-PHASE-MODULATED PCM REPEATER

William M. Hubbard, Middletown Township, Monmouth County, N.J., assignor to Bell Telephone Laboratories, Incorporated, Murray Hill, N.J., a corporation of New York Filed Aug. 8, 1967, Ser. No. 659,209
Int. Cl. H04b *7/16;* H04l *27/18;* H03c *3/00*
U.S. Cl. 325—7 6 Claims

ABSTRACT OF THE DISCLOSURE

The application describes apparatus for detecting and regenerating a quaternary differential-phase-modulated PCM signal in which the differential phase shift is either $\pi/4$, $-\pi/4$, $3\pi/4$ or $-3\pi/4$ radians.

The detector divides the input signal into two components. Each component is then coupled to a binary-type differential phase detector having a particular differential phase delay. The two resulting baseband signals $V_1$ and $V_2$ derived from the detector define the differential phase shift between signals in adjacent time slots.

Means for utilizing signals $V_1$ and $V_2$ to regenerate the alternating current, differential-phase-modulated signal are also described.

This invention relates to repeaters and receivers for four-state, differential-phase-modulated PCM signals, also referred to as differentially coherent, phase-shift-keyed (DCPSK) modulation.

BACKGROUND OF THE INVENTION

In the copending application by W. D. Warters, Ser. No. 568,893, filed July 29, 1966, and assigned to applicant's assignee, there is described a two-state, differential-phase-modulated PCM communication system. In this system, a high frequency signal is frequency modulated above and below some reference frequency to produce an equivalent phase modulation of either +90 degrees or −90 degrees. The various advantages of such a system are described by Warters, as are various arrangements for detecting and regenerating the signal.

It is well known that more efficient use can be made of the frequency spectrum by increasing the number of possible signal states from two to more than two. For example, a four-state, or quaternary system, permits the combining and transmission, along the same transmission path, of two binary-encoded signals. In general, a $2^p$-state system would permit the multiplexing of $p$ binary-encoded signals.

SUMMARY OF THE INVENTION

The present invention relates to apparatus and methods for detecting and regenerating a quaternary differential-phase-modulated (DPM) signal in which the differential phase shift is either $\pi/4$, $-\pi/4$, $3\pi/4$ or $-3\pi/4$ radians. The apparatus includes a quaternary differential phase detector, signal regenerators, a translator, and a remodulator.

The phase detector, in accordance with the present invention, comprises a power divider for dividing the DPM signal into two components. Each of the two signal components is then detected in a binary-type differential phase detector having a particular differential phase delay, to produce two signals $V_1$ and $V_2$. One of these signals, $V_2$, is indicative of the magnitude of the differential phase shift, ($\pi/4$ or $3\pi/4$) between signals in adjacent time slots, while the other signal, $V_1$, is indicative of the sign (±) of the phase shift. Thus, these two detected signals contain all the information necessary to reconstruct the signal. However, the manner in which this information is utilized

2 depends, in the case of a repeater, upon the nature of the remodulator.

In general, after detection and regeneration, the two signals $V_1$ and $V_2$ are combined by means of a translator, to produce a new pair of signals $\mu_1$ and $\mu_2$ which operate upon the remodulator. In a particular embodiment of the invention, to be described in greater detail hereinbelow, the $\mu_1$ signal, which is a function of both $V_1$ and $V_2$, operates upon an FM deviator to produce a phase deviation of either $\pm\pi/4$, while the $\mu_2$ signal, which is a function of only $V_2$, causes an additional 180 degrees phase delay to be introduced where required. The effect of this additional 180 degrees delay is to produce the equivalent of a $\pm 3\pi/4$ phase shift (i.e., $$\frac{\pi}{4}+\pi$$

is equivalent to $-3\pi/4$, and $$-\frac{\pi}{4}+\pi$$

is equal to $+3\pi/4$).

These and other objects and advantages, the nature of the present invention, and its various features, will appear more fully upon consideration of the various illustrative embodiments now to be described in detail in connection with the accompanying drawings.

DETAILED DESCRIPTION

Figure 1:
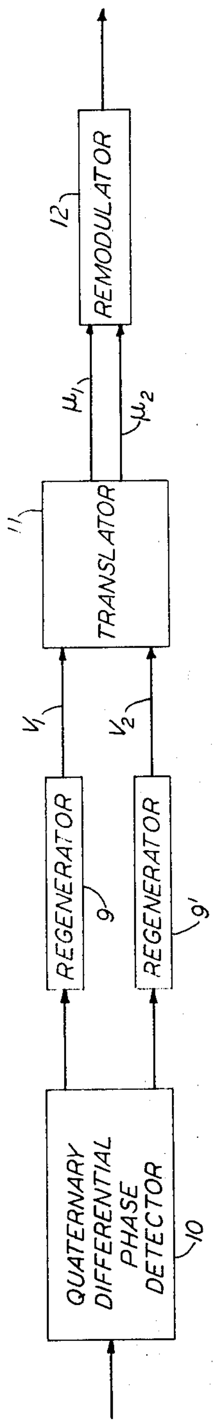
FIG. 1 shows, in block diagram, a portion of a repeater for use in a quaternary differential-phase-modulated PCM system including a quaternary differential phase detector, two signal regenerators, a translator and a remodulator.
Figure 2:
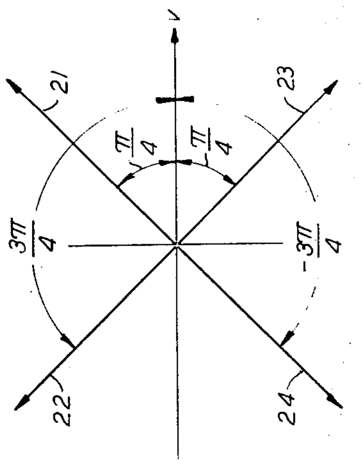
FIG. 2, included for purposes of explanation, shows the four possible phase changes the signal can experience between successive sampling intervals.

Referring to the drawings, FIG. 1 shows, in block diagram, those portions of a PCM repeater to which the present invention relates. These include a quaternary differential phase detector 10, signal regenerators 9 and 9', a translator 11, and a remodulator 12. In principle, the repeater can be adapted to regenerate any four-level differential-phase-modulated PCM signal. In particular, however, the four-level signal to which the present invention relates is characterized by a constant amplitude wave whose phase deviates by either $+\pi/4$, $-\pi/4$, $+3\pi/4$ or $-3\pi/4$ radians between sampling intervals in adjacent time slots. This signal is represented in FIG. 2 by a vector, $v$, depicting the signal phase at any sampling instant, and by vectors 21, 22, 23 and 24 depicting the four possible phase states at the next sampling instant. For example, the phase can deviate by $\pi/4$ radians, as represented by vector 21, or by any of the other amounts indicated above, as represented by vectors 22, 23, and 24. The function of the arrangement of FIG. 1 is to determine the magnitude and sign of this phase shift and to regenerate the signal. In the discussion to follow, each of the blocks of FIG. 1 is considered in greater detail.

The first of the components to be considered is the quaternary differential phase detector 10. It is the function of the detector to examine the relative phase of the input signal in two adjacent time slots, and to make two determinations. One determination relates to the magnitude of the phase difference. The other determination relates to the sign of the phase difference. In the detector shown in FIG. 3, the results of these determinations are indicated, respectively, by the sign of the two detector output signals $V_1$ and $V_2$, as will be described in greater detail hereinbelow.

Figure 3:
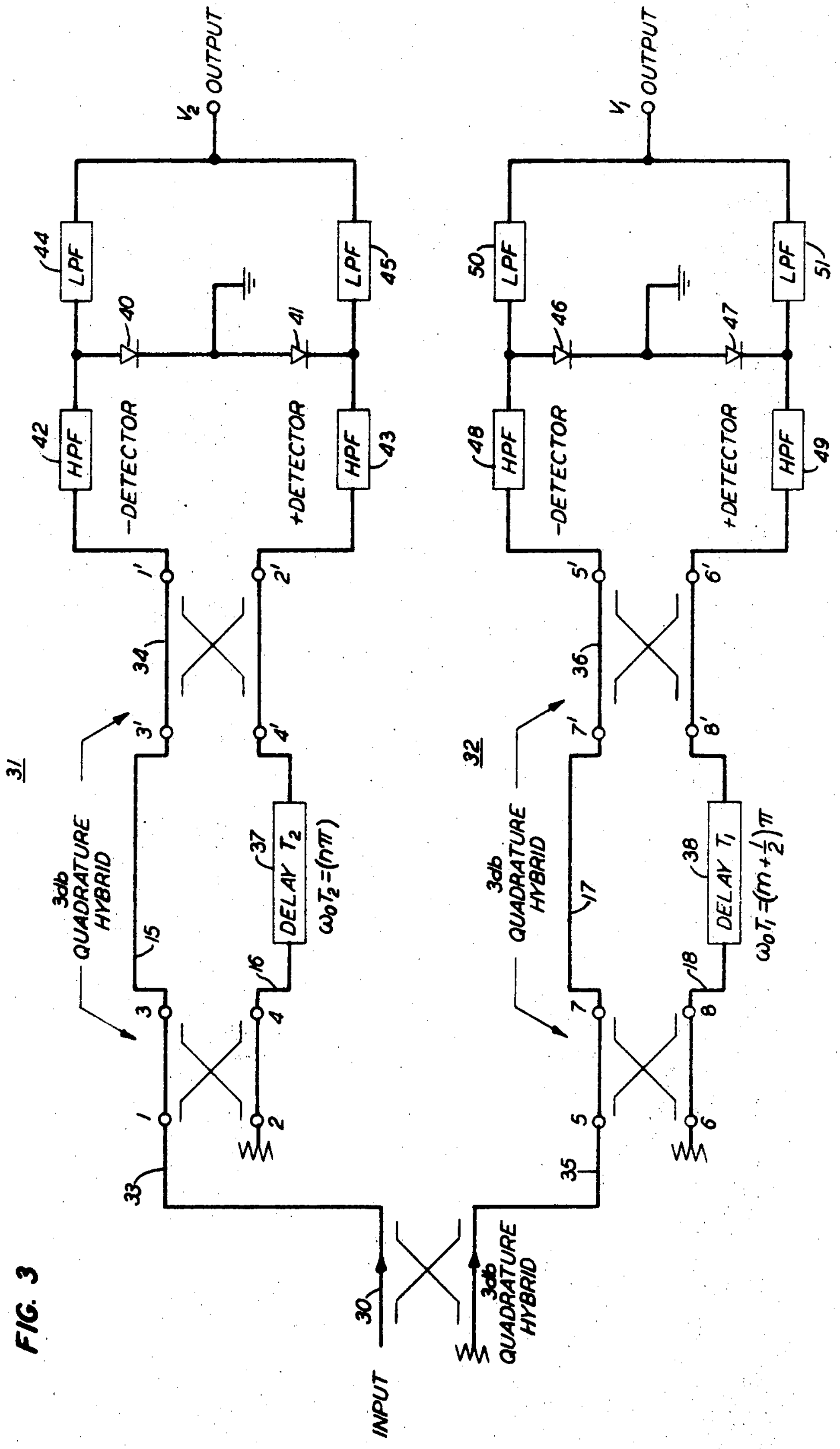
FIG. 3 shows, in greater detail, a quaternary differential phase detector in accordance with the invention.

Referring to FIG. 3, detector 10 comprises a first power divider 30 for dividing the input signal into two, preferably equal, signal components. In general, any convenient type of divider can be used. In the illustrative embodiment, a 3 db quadrature hybrid is employed.

Each of the two signal components, in turn in turn, is coupled to one of two binary-type differential phase detectors 31 and 32. The latter are essentially similar to the binary-type differential phase detector described in the above-mentioned copending application by Warters.

Basically, each of the binary-type detectors 31 and 32 comprises a pair of interconnected 3 db hybrid junctions 33–34 and 35–36, and an associated amplitude detector. In the illustrative embodiment the hybrids are identified as quadrature (90°) hybrids. However, 180 degree hybrids can just as readily be used, or a mixture of 180° and 90° hybrids can be used. In the latter case, however, the output signals, $V_1$ and $V_2$, are interchanged, and appropriate account of this fact must be taken.

The pairs of conjugate branches associated with hybrid 33 are designated 1–2 and 3–4. Those associated with hybrid 34 are designated 1′–2′ and 3′–4′. One of the input signal components derived from power divider 30 is applied to branch 1 of hybrid 33. Branch 2 is resistively terminated. Branches 3 and 4 of hybrid 33 are connected, respectively, to branches 3′ and 4′ of hybrid 34 by means of wavepaths 15 and 16. One of these wavepaths 16 includes a delay network 37 for reasons which are explained in greater detail hereinbelow.

The remaining branches 1′ and 2′ of hybrid 34 are connected to a pair of oppositely-poled amplitude detectors. In the illustrative embodiment the amplitude detectors comprise diodes 40 and 41 and associated high pass filters 42 and 43 and low pass filters 44 and 45.

Diode 40 is designated a "−detector" as it is poled to generate a negative output signal, whereas diode 41 is designated a "+detector" as it is poled to generate a positive output signal. Output signal $V_1$ is obtained by connecting the two amplitude-detected signals to a common output terminal through low pass filters 44 and 45.

The other binary-type detector 32 is similarly connected. Thus, designating the pairs of conjugate branches associated with hybrid 35 as 5–6 and 7–8, and those assocciated with hybrid 36 as 5′–6′ and 7′–8′, the second input signal component derived from power divider 30 is applied to branch 5 of hybrid 35. Branch 6 is resistively terminated. Branches 7 and 8 of hybrid 35 are connected, respectively, to branches 7′ and 8′ of hybrid 36 by means of wavepaths 17 and 18, one of which includes a delay network 38.

The remaining branches 5′ and 6′ of hybrid 36 are connected to a second pair of oppositely-poled amplitude detectors comprising diodes 46 and 47 and the associated filters 48, 49, 50 and 51. In accordance with the manner of connection, diode 46 is the "−detector" and diode 47 the "+detector." Output signal $V_2$ is obtained by connecting the two detected signals to a common output terminal through low pass filters 50 and 51.

As indicated above, it is the function of a differential phase detector to determine the relative phase between signals in adjacent time slots. In the binary differential phase detector used by Warters, and described in his copending application, the two signals to be compared arrive at the input branches of the second hybrid in such a phase that they are combined in either one or the other of the hybrid output branches. This results in a detected output signal whose polarity is indicative of the two possible phase states of the signal. In the instant case, however, the situation is more complicated as there are now four phase states which must be identified. As a consequence, the phase relationships required in at least one of the two detectors 31 and 32 of FIG. 3 is different that that in the ordinary binary differential phase detector. In addition, since the two detectors 31 and 32 are intended to provide different information regarding the signal, the phase relationships in these two detectors are, of necessity, different. These differences are reflected in the net delay introduced by delay networks 37 and 38.

The first requirement placed upon the two delay networks is that they delay the signal a length of time substantially equal to one time slot T. This is common to both networks and can be expressed by $$T_1 \approx T_2 \approx T \quad (1)$$

where $T_1$ and $T_2$ are the time delays introduced by networks 37 and 38, respectively.

It is found in practice that $T_1$ and $T_2$ can differ from T by about 20 percent, without significantly affecting the performance of the detector. This, however, can be considered as a coarse overall adjustment. More precisely, the delay introduced by network 37, expressed in terms of the signal phase is given by $$\omega_0 T_2 = n\pi \text{ radians} \quad (2)$$

where $n$ is an integer, and $\omega_0$ is an angular frequency of the signal.

For network 38, $$\omega_0 T_1 = (m+1/2)\pi \text{ radians} \quad (3)$$

where $m$ is an integer.

The integers $n$ and $m$ are selected to satisfy the delay requirement set forth in Equation 1.

With the network adjusted in the manner indicated, the normalized output signals $V_1$ and $V_2$ for each of the possible phase states of the signal are given in Table I.

TABLE I

| Differential phase shift | $V_1$ | $V_2$ |
|---|---|---|
| $\pi/4$ | 1 | 1 |
| $3\pi/4$ | 1 | −1 |
| $-\pi/4$ | −1 | 1 |
| $-3\pi/4$ | −1 | −1 |

TABLE I

As can be seen, the polarity of output signal $V_1$ is indicative of the sign (±) of the differential phase shift, while the polarity of output signal $V_2$ is indicative of the magnitude ($\pi/4$ or $3\pi/4$) of the differential phase shift. Accordingly, these two signals contain all of the information required either to reconstruct the original baseband signals, or to regenerate the high frequency signal. The manner in which this information is used depends upon the nature of the particular circuits used to achieve either of these ends.

Following detection, and prior to being coupled to translator 11, baseband signals $V_1$ and $V_2$ are advantageously regenerated by means of regenerators 9 and 9′. The latter are selected from among the many such circuits known in the art. (For a discussion of signal regenerators, see "Transmission Systems for Communications" by members of the technical staff, Bell Telephone Laboratories, revised 3rd edition, chapter 26).

Figure 4:
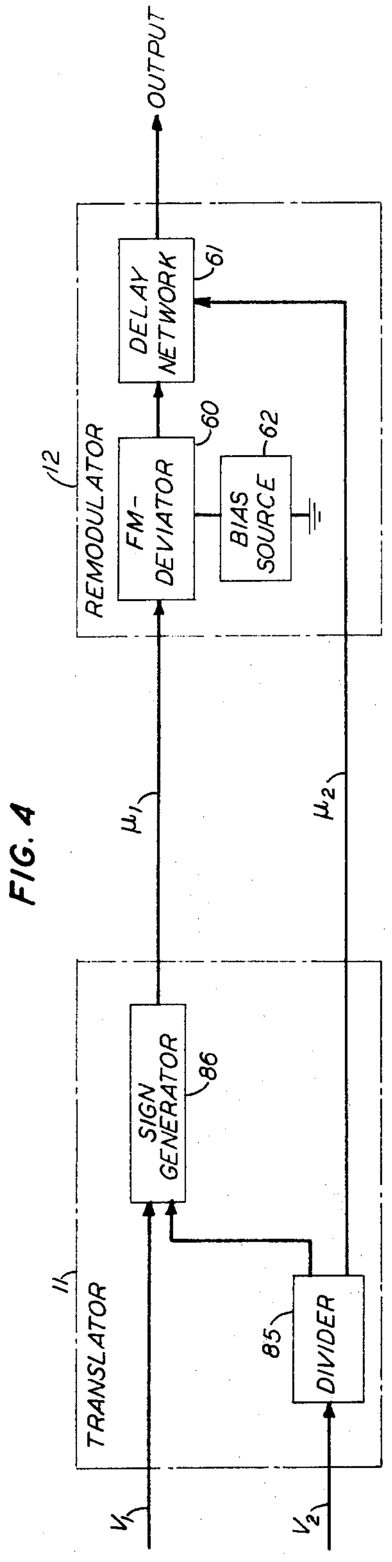
FIG. 4 shows, in block diagram, a translator and a remodulator in accordance with the invention.

FIG. 4 shows, in block diagram, details of a translator and of a remodulator for regenerating the DPM signal in accordance with the present invention. In general it is the function of translator 11 to convert signals $V_1$ and $V_2$ into a second set of signals $\mu_1$ and $\mu_2$ which operate remodulator 12. Since the specific form of this signal translation depends upon the input requirements of the remodulator, the latter of these two stages is considered first.

As depicted in FIG. 4, remodulator 12 comprises an FM-deviator 60, whose output end is coupled to a delay network 61. The latter introduces an additional delay of either zero degrees or 180 degrees, depending upon the polarity of signal $\mu_2$, as will be explained in greater detail hereinbelow.

FM-deviator 60 can be any variety of voltage-controlled oscillator, such as a tunnel diode oscillator, whose frequency of oscillation is a function of the bias applied thereto. The unmodulated oscillator frequency is typically established by a bias source 62. Frequency modulation is produced by signal $\mu_1$ coupled to deviator 60 in a manner to vary its instantaneous bias.

As is known, a frequency varying signal $f(t)$ undergoes a phase shift $\Delta\varphi$, measure relative to a reference signal at frequency $f_0$, that is given by $$\Delta\varphi=2\pi\int_{t_1}^{t_2}[f(t)-f_0]dt$$

where the integration is over the time interval $t_2-t_1$. In a PCM system, the integration is taken over a period equal to one time slot. In accordance with the present invention, the signal applied to the FM-deviator is such as to produce a phase shift equivalent to either $+\pi/4$ or $-\pi/4$ radians. However, since phase shifts of $+3\pi/4$ and $-3\pi/4$ radians may also be required, means comprising delay network 61 are included to provide this additional phase shift when required.

Figure 5:
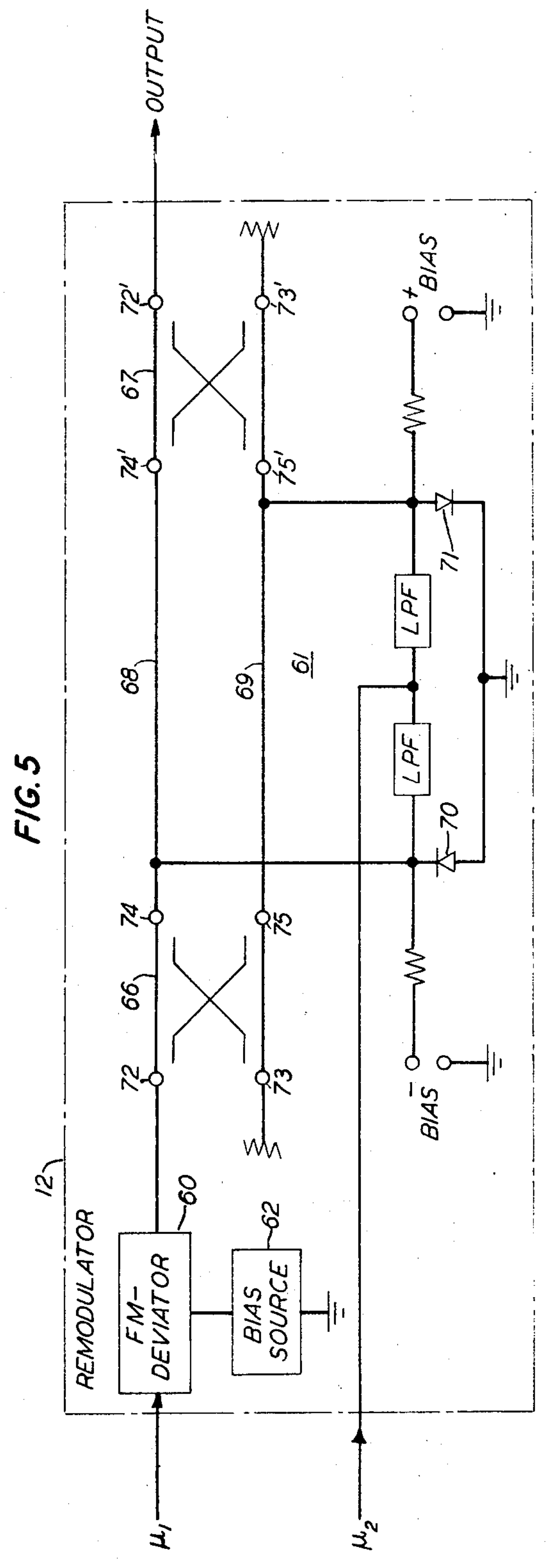
FIG. 5 shows the circuit details of an illustrative remodulator.

The circuit details of one embodiment of a delay network for use in remodulator 12 are given in FIG. 5. As depicted therein, network 61 comprises a pair of interconnected 3 db quadrature hybrid junctions 66 and 67. The pairs of conjugate branches associated with hybrid 66 are designated 72–73 and 74–75. Those associated with hybrid 67 are designated 72′–73′ and 74′–75′. Of these branches 73 and 73′ are resistively terminated.

Branches 72 of hybrid 66 constitutes the input branch to the delay network, and is the branch to which the FM-deviator is connected. Branch 72′ of hybrid 67 constitutes the output branch of the remodulator.

Branches 74 and 75 of hybrid 66 are connected, respectively, to branches 74′ and 75′ of hybrid 67 by means of two substantially identical wavepaths 68 and 69. In addition, each of these two wavepaths is connected to ground by means of one of two, oppositely-poled diodes 70 and 71. The diodes are biased to a point in their low conductivity region and appear essentially as open circuits across the wavepaths.

In operation, a signal $\mu_1$, derived from translator 11, is applied to the FM-deviator. Depending upon the polarity of the signal, the instantaneous frequency of the deviator changes by an amount which, when integrated over a period equivalent to one time slot, is equal to a phase deviation of either $+\pi/4$ or $-\pi/4$ radians. Simultaneously, a second signal, $\mu_2$, also derived from translator 11, is applied to the diodes through a pair of low pass filters (LPF). Depending upon the polarity of $\mu_2$, one of the diodes is driven into a high conductivity state, thereby shorting to ground the wavepath across which it is connected. The other diode, on the other hand, is driven further into its low conductivity state, thus leaving the other wavepath unaffected.

As a consequence of the application of signal $\mu_2$, the output signal from deviator 60 is capable of propagating through only one of the two possible wavepaths before reaching output terminal 72′. For example, when $\mu_2$ is positive, diode 71 is driven into a high conductivity state, thereby shorting to ground that portion of the signal coupled between branch 72 and branch 75 of hybrid 66. Diode 70, on the other hand, remains in a low conductivity state leaving the portion of the signal coupled to branch 74 unaffected. This portion of the signal is thus capable of propagating along path 68 to branch 74′ of hybrid 67, where it again divides into two equal portions. One half of the signal is coupled to branch 73′ where it is dissipated in the terminating resistor. The other half of the signal is coupled to branch 72′, and constitutes the remodulator output signal.

When $\mu_2$ is negative, the other diode 70 is caused to conduct, shorting out wavepath 68. The output signal then follows a course from branch 72 to branch 75, along wavepath 69 to branch 75′ and then to output branch 72′. In this latter case, an additional 90 degree phase delay is introduced by each of the two quadrature hybrids for a total added dealy of 180 degrees relative to the delay introduced when the signal propagates along path 68. Thus, depending upon the polarity of signal $\mu_2$, the total differential delay between signals in adjacent time slots is either $+\pi/4$, $-\pi/4$, $+\pi/4+\pi\doteq-3\pi/4$ (modulo $2\pi$) or $-\pi/4+\pi\doteq+3\pi/4$.

Table II, given below, shows the relative phase delay for different combinations of signals $\mu_1$ and $\mu_2$. Also given are the corresponding values of $V_1$ and $V_2$.

TABLE II

| $\mu_1$ | $\mu_2$ | Delay | $V_1$ | $V_2$ |
|---|---|---|---|---|
| +1 | +1 | $\pi/4$ | 1 | 1 |
| −1 | −1 | $3\pi/4$ | 1 | −1 |
| −1 | +1 | $-\pi/4$ | −1 | 1 |
| +1 | −1 | $-3\pi/4$ | −1 | −1 |

It will be noted in Table II that the sign of $\mu_1$ is positive when the signs of $V_1$ and $V_2$ are the same, and negative when the signs of $V_1$ and $V_2$ are different. That is, sgn. $\mu_2$=(sgn. $V_1$) (sgn. $V_2$). Signal $\mu_2$, on the other hand, has the same sign as signal $V_2$. These two requirements, in effect, define translator 11.

One arrangement for generating signals $\mu_1$ and $\mu_2$ is illustrated in FIG. 4 which shows a translator comprising a signal divider 85 and a sign generator 86. Signal $V_2$, derived from the quaternary phase detector, is coupled to the divider wherein it is divided into two components. One of these components is coupled to the remodulator as signal $\mu_2$. The other $V_2$ component and signal $V_1$ are coupled to the sign generator which generates signal $\mu_1$.

Figure 6:
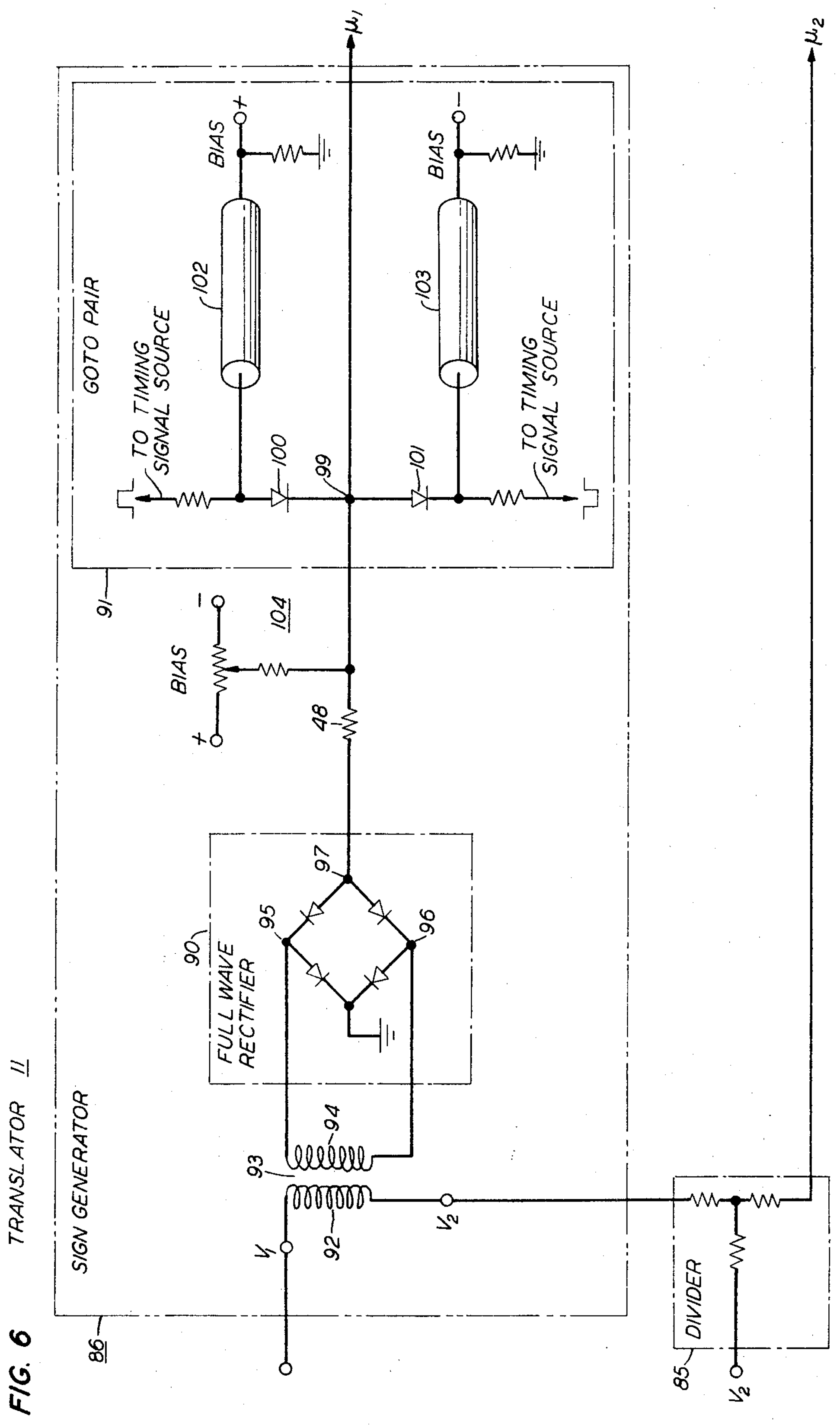
FIG. 6 shows the circuit details of an illustrative translator.

In the specific embodiment of translator 11 illustrated in FIG. 6, sign generator 86 comprises a bridge-type full wave rectifier 90 and a so-called "Goto-pair" 91. (For a more detailed description of the Goto-pair circuit, see "Some New High-Speed Tunnel-Diode Logic Circuits," by M. S. Axelrod et al., I.B.M. Journal, April 1962, pages 158–169).

In operation, signals $V_1$ and $V_2$ are coupled to opposite ends of primary winding 92 on transformer 93. Secondary winding 94 is connected to the input terminals 95 and 96 of rectifier 90. Output terminal 97 is coupled through a resistor 98 to the common junction 99 of diodes 100 and 101. The latter, which are connected series-aiding, are characterized by current-voltage curves which include first and second positive resistance regions, and a negative resistance region therebetween. The diodes are biased, through the lengths of transmission line 102 and 103, at operating points within their first positive resistance regions. A second biasing circuit 104 is used to establish a slight imbalance in the bias, however, for reasons which are explained hereinbelow.

In operation, a balanced timing pulse, synchronized with the pulse repetition rate of the differential phase modulated signal, is applied across the diodes. The polarity and amplitude of the timing pulse is such as to drive the operating points of both diodes towards their negative resistance regions. Depending upon which one of the two diodes reaches its negative resistance region first, one or the other diode switches to an operating point in its second positive resistance region, producing either a positive or a negative output pulse at their common junction 99.

When $V_1$ and $V_2$ are of the same polarity, no net signal is coupled to the rectifier and, hence, there is no change produced in the operating point of either diode. Under these conditions, the diodes are biased such that diode 101 switches in response to the timing signal, producing a positive output pulse. If, on the other hand, $V_1$ and $V_2$ are of opposite polarities, the rectifier draws current, raising the bias across diode 100 and causing it to switch in response to the timing signal. Under these conditions a negative output pulse is produced.

The result is that an output pulse of one polarity is produced when the polarities of input signals $V_1$ and $V_2$ are the same, whereas an output pulse of the opposite polarity is produced when the polarities of input signals $V_1$ and $V_2$ are different.

It should be noted that the indicated polarities of the various signals $V_1$, $V_2$, $\mu_1$ and $\mu_2$ are merely illustrative. By the simple expedient of reversing diode connections, or by the inclusion of amplifiers, other combinations of signal polarities can be devised to produce the required regenerated output signal. It should also be noted that the specific translator and remodulator circuits shown are merely intended to be illustrative, and that other circuits can just as readily be used. In addition, it is understood that amplifiers, which have not been shown, would typically be included to control the amplitude of the various signals. Thus, in all cases it is understood that the abovedescribed arrangement is illustrative of but one of the many possible specific embodiments which can represent applications of the principles of the invention. Numerous and varied other arrangements can readily be devised in accordance with these principles by those skilled in the art without departing from the spirit and scope of the invention.

What is claimed is:

1. In a quaternary differential-phase-modulated communication system adapted for transmitting a differential-phase-modulated signal characterized by a constant amplitude, alternating current wave whose phase is shifted by either $\pi/4$, $-\pi/4$, $3\pi/4$ or $-3\pi/4$ radians between successive time slots, a signal regenerator comprising:

a quaternary phase detector adapted to receive said signal and to produce, in response thereto, two output signals $V_1$, and $V_2$, where $V_1$ is indicative of the sign of the differential phase shift of said signal, and $V_2$ is indicative of the magnitude of the differential phase shift of said signal;

a translator for converting $V_1$ and $V_2$ to a second pair of signals $\mu_1$ and $\mu_2$, where the polarity of $\mu_1$ is a function of the polarities of $V_1$ and $V_2$, and the polarity of $\mu_2$ is a function of the polarity of $V_2$;

and a remodulator for regenerating said differential-phase-modulated signal comprising an oscillator whose output frequency varies in response to signal $\mu_1$ to produce an equivalent phase deviation of $+\pi/4$ or $-\pi/4$ radians, and a delay network for introducing an additional phase shift of either zero degrees or 180 degrees in response to signal $\mu_2$.

2. The regenerator in accordance with claim 1 wherein $\mu_2$ is positve when the polarities of $V_1$ and $V_2$ are the same, and negative when the polarities of $V_1$ and $V_2$ are different.

3. The regenerator according to claim 1 wherein said phase detector comprises:

a power dividing network for dividing said signal into two equal portions;

means for coupling said signal portions to first and second circuits, each of which comprises;

a first hybrid junction for further dividing the signal portion coupled thereto into two equal components;

means for delaying one of said components relative to the other of said components characterized in that the relative time delay $T_1$ in the first of said circuits is given by $$\omega_0 T_1 = (m+1/2)\pi \text{ radians}$$

and in that the relative time delay $T_2$ in the second of said circuits is given by $$\omega_0 T_2 = n\pi \text{ radians}$$

where $\omega_0$ is the angular frequency of the signal at the sampling interval;

$m$ and $n$ are integers;

and $T_1$ and $T_2$ are substantially equal to one time slot;

a second hybrid junction for combining said delayed component and said other component;

means for coupling the respective output signals from said second hybrid junction to a pair of oppositely-poled amplitude detectors;

and means for combining the detected output signals derived from said amplitude detectors in a common output terminal to produce said output signal $V_1$ from the first of said circuits, and said output signal $V_2$ from the second of said circuits.

4. The regenerator according to claim 1 wherein said translator includes a sign generator comprising:

first and second diodes each characterized by a current-voltage characteristic which includes first and second positive resistance regions and a negative resistance region therebetween;

said diodes being connected series-aiding across a balanced bias source and being biased at operating points within their first positive resistance regions;

means for applying a timing pulse across said diodes;

said timing pulse having the polarity and amplitude to drive said diodes into their negative resistance regions causing the operating point of one or the other of said diodes to switch to the second positive resistance region of its current-voltage characteristic;

means for establishing an imbalance in the bias across said diodes such that one of said diodes switches in response to said timing pulse in preference to the other of said diodes;

means responsive to said $V_1$ and $V_2$ signals for changing the relative biases across said diodes such that the other of said diodes switches in response to said timing pulse when the polarities of signals $V_1$ and $V_2$ are different;

and means for coupling out of said generator at the common junction between said diodes.

5. The generator according to claim 4 wherein the imbalance in said bias is such as to produce a positive output pulse;

and wherein a negative output pulse is produced when signals $V_1$ and $V_2$ are of different polarities.

6. The regenerator according to claim 1 wherein said remodulator comprises:

a voltage-sensitive oscillator whose output frequency varies in response to said $\mu_1$ signal;

and means for coupling the output from said oscillator to an adjustable delay network for introducing a relative delay of either zero degrees or 180 degrees in response to said $\mu_2$ signal.

References Cited

UNITED STATES PATENTS

| | | | |
|---|---|---|---|
| 3,244,986 | 4/1966 | Rumble | 325—30 |
| 3,368,038 | 2/1968 | Ringelhaan | 178—70 |

ROBERT L. GRIFFIN, Examiner

J. A. BRODSKY, Assistant Examiner

U.S. Cl. X.R.

178—67, 88; 307—236; 325—30; 329—116; 332—19